(12) United States Patent
Miura

(10) Patent No.: US 9,813,583 B2
(45) Date of Patent: Nov. 7, 2017

(54) FACSIMILE APPARATUS, METHOD OF CONTROLLING FACSIMILE APPARATUS, AND STORAGE MEDIUM

(71) Applicant: CANON KABUSHIKI KAISHA, Tokyo (JP)

(72) Inventor: Shigeo Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/173,401

(22) Filed: Jun. 3, 2016

(65) Prior Publication Data

US 2016/0360064 A1    Dec. 8, 2016

(30) Foreign Application Priority Data

Jun. 8, 2015 (JP) ................................. 2015-116055

(51) Int. Cl.
*H04M 11/00* (2006.01)
*H04N 1/327* (2006.01)
*H04N 1/00* (2006.01)

(52) U.S. Cl.
CPC ..... *H04N 1/32728* (2013.01); *H04N 1/00323* (2013.01); *H04N 1/3273* (2013.01); *H04N 2201/0093* (2013.01)

(58) Field of Classification Search
CPC ........... H04N 1/32728; H04N 1/00323; H04N 1/3273; H04N 2201/0093
See application file for complete search history.

(56) References Cited

U.S. PATENT DOCUMENTS

| | | | |
|---|---|---|---|
| 6,343,069 B1 * | 1/2002 | Gadsby | H04M 1/76 370/252 |
| 2005/0220281 A1* | 10/2005 | Ito | H04M 1/6016 379/100.01 |
| 2006/0192428 A1* | 8/2006 | Ito | H04B 3/54 307/1 |

FOREIGN PATENT DOCUMENTS

JP    2007065967 A    3/2007

* cited by examiner

*Primary Examiner* — Stella Woo
(74) *Attorney, Agent, or Firm* — Canon U.S.A., Inc. IP Division

(57) ABSTRACT

A facsimile apparatus includes a first detection unit, a second detection unit, a third detection unit, and a determination unit. The first detection unit detects a line voltage in an on-hook state. The second detection unit detects a line voltage in an off-hook state. The third detection unit detects a line current in an off-hook state. The determination unit determines a line impedance based on the line voltage detected by the first detection unit, the line voltage detected by the second detection unit, and the line current detected by the third detection unit.

20 Claims, 9 Drawing Sheets

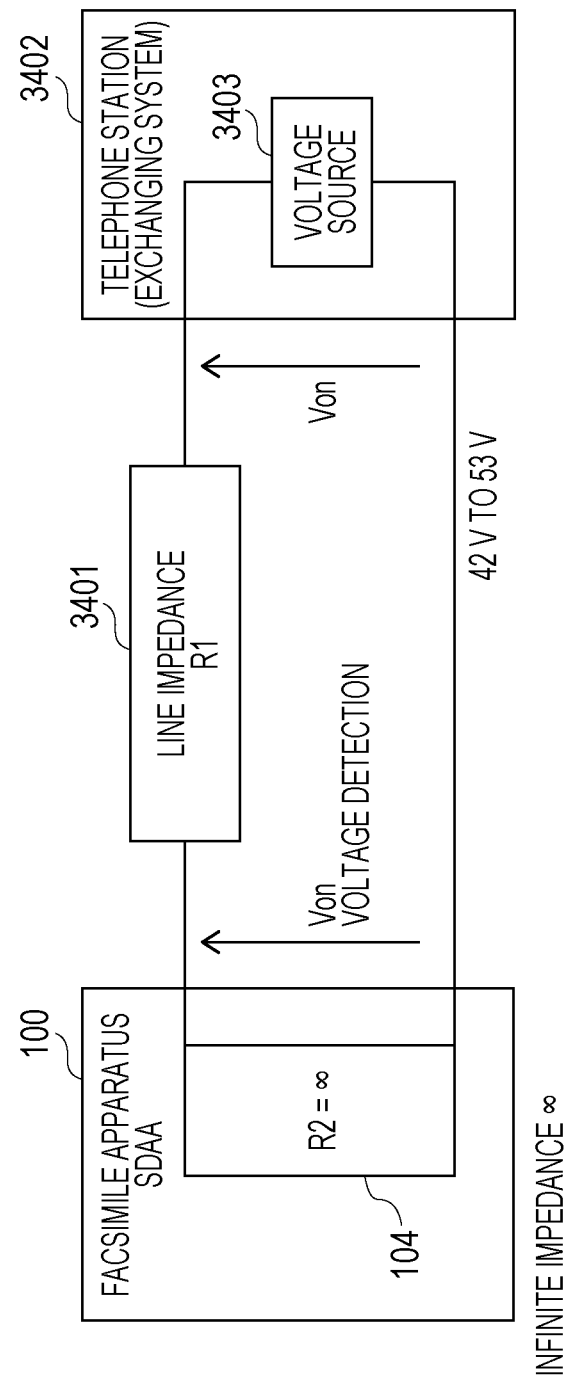

ns relates to a facsimile apparatus, a
FACSIMILE APPARATUS, METHOD OF CONTROLLING FACSIMILE APPARATUS, AND STORAGE MEDIUM

BACKGROUND OF THE INVENTION

Field of the Invention

The present inventions relates to a facsimile apparatus, a method of controlling a facsimile apparatus, and a storage medium.

Description of the Related Art

SLR (Send Loudness Rating) is known as an international standard for evaluation on a transmission level of a communication device (for example, a mobile telephone device). As a measure of the loudness of the transmit audio sent through a communication device microphone, for example, SLR compares the amplitude of the sound waves into the microphone to the resulting audio signal. The SLR comparison indicates a loss, and thus, when the transmission gain (amplification gain) of a facsimile is increased, the result is a reduction in the SLR.

In each country, a national standard for a transmission level in SLR is determined. For example, in China, there is an institution called Network Access License (NAL) that manages communication, and the standard GB/T15279-2002 for the transmission level has been established by China NAL. According to the standard, in a case where the distance to an exchanging system is large, the transmission gain is increased, while in a case where the distance to an exchanging system is small, the transmission gain is reduced. This is performed to prevent the sound/voice level from being too large or too small due to an influence of line impedance.

In conventional telephone devices, the distance to an exchanging system is determined based only on a line current in an off-hook state such that when the line current is smaller than a threshold value, it is determined that the distance to the exchanging system is large, but in a case where the line current is larger than the threshold value, it is determined that the distance to the exchanging system is small, and the transmission gain is determined based on the determined distance to the exchanging system.

Japanese Patent Laid-Open No. 2007-165967 discloses a technique in which an audio signal loss of a communication path is estimated, and the audio signal level is adjusted to a target value based on the estimated voice signal loss. More specifically, the telephone voice volume is adjusted depending on the line loss, of a communication path such that when the loss is large, the voice volume is increased to make it is possible for a user to easily hear a voice, but when the loss is small, the voice volume is reduced such that the voice is not too loud.

In a case where a facsimile apparatus has an internal telephone function, unlike a case where an external telephone device is connected to a facsimile apparatus, a telephone voice communication is performed via a silicon data access arrangement (SDAA, semiconductor NCU). To ensure the facsimile communication performance, the SDAA changes the impedance of the facsimile apparatus itself when necessary according to a DC-VI characteristic preset in the SDAA.

In the conventional technique in which telephone voice communication is performed without the SDAA intervening, the impedance of the apparatus is fixed and thus the current is stable. The current is proportional to the voltage, and thus it is allowed to determine the transmission gain based on the line current in the off-hook state so as to achieve a proper voice volume in telephone voice communication.

However, in the case of the facsimile apparatus configured to perform telephone voice communication via the SDAA, an influence of a change in internal impedance of the apparatus makes, it difficult to properly determine the distance to an exchanging system only based on the line current in the off-hook state.

Also in the technique disclosed in Japanese Patent Laid-Open No. 2007-165967, the technique does not take into consideration effects of a time-dependent change in impedance of the apparatus in the off-hook state.

SUMMARY OF THE INVENTION

A facsimile apparatus is configured to properly determine a line impedance, even in a situation in which an internal impedance of the facsimile apparatus changes. According to an aspect of the present embodiments, a facsimile apparatus includes a first detection unit configured to detect a line voltage in an on-hook state, a second detection unit configured to detect a line voltage in an off-hook state, a third detection unit configured to detect a line current in an off-hook state, and a determination unit configured to determine a line impedance based on the line voltage detected by the first detection unit, the line voltage detected by the second detection unit, and the line current detected by the third detection unit.

Further features of the present invention will become apparent from the following description of exemplary embodiments with reference to the attached drawings.

BRIEF DESCRIPTION OF THE DRAWINGS

FIG. 2 is a block diagram illustrating a configuration of a system including a facsimile apparatus and an exchanging system according to an embodiment.

DESCRIPTION OF THE EMBODIMENTS

The present invention is described in further detail below with reference to embodiments in conjunction with the accompanying drawings. Note that these embodiments are described by way of example only and not limitation. Also note that all parts, elements, or steps described in embodiments are not necessarily needed to practice the invention.

First Embodiment

Figure 1A:
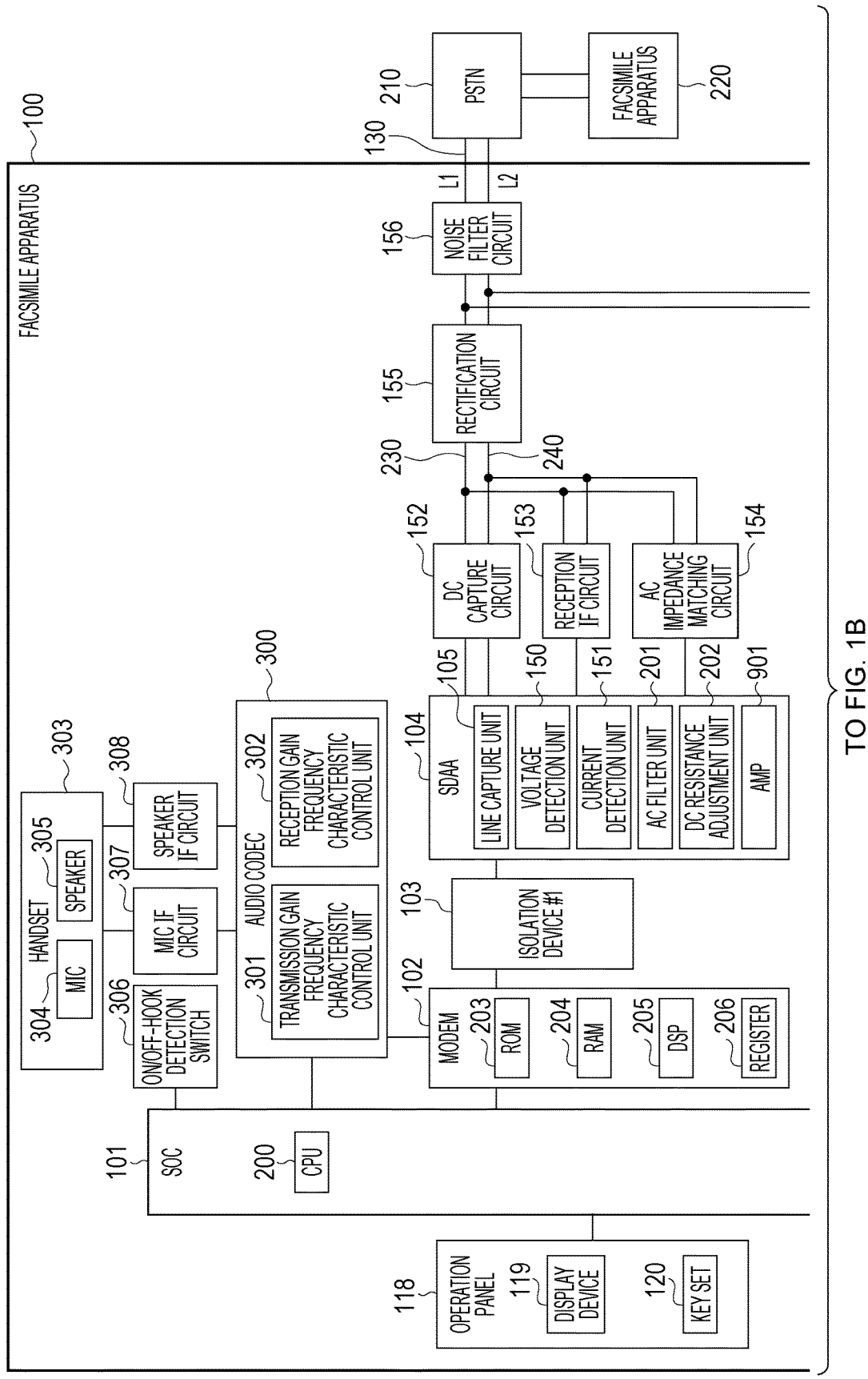
FIGS. 1A and 1B are block diagrams illustrating a configuration of a facsimile apparatus according to an embodiment.
Figure 1B:
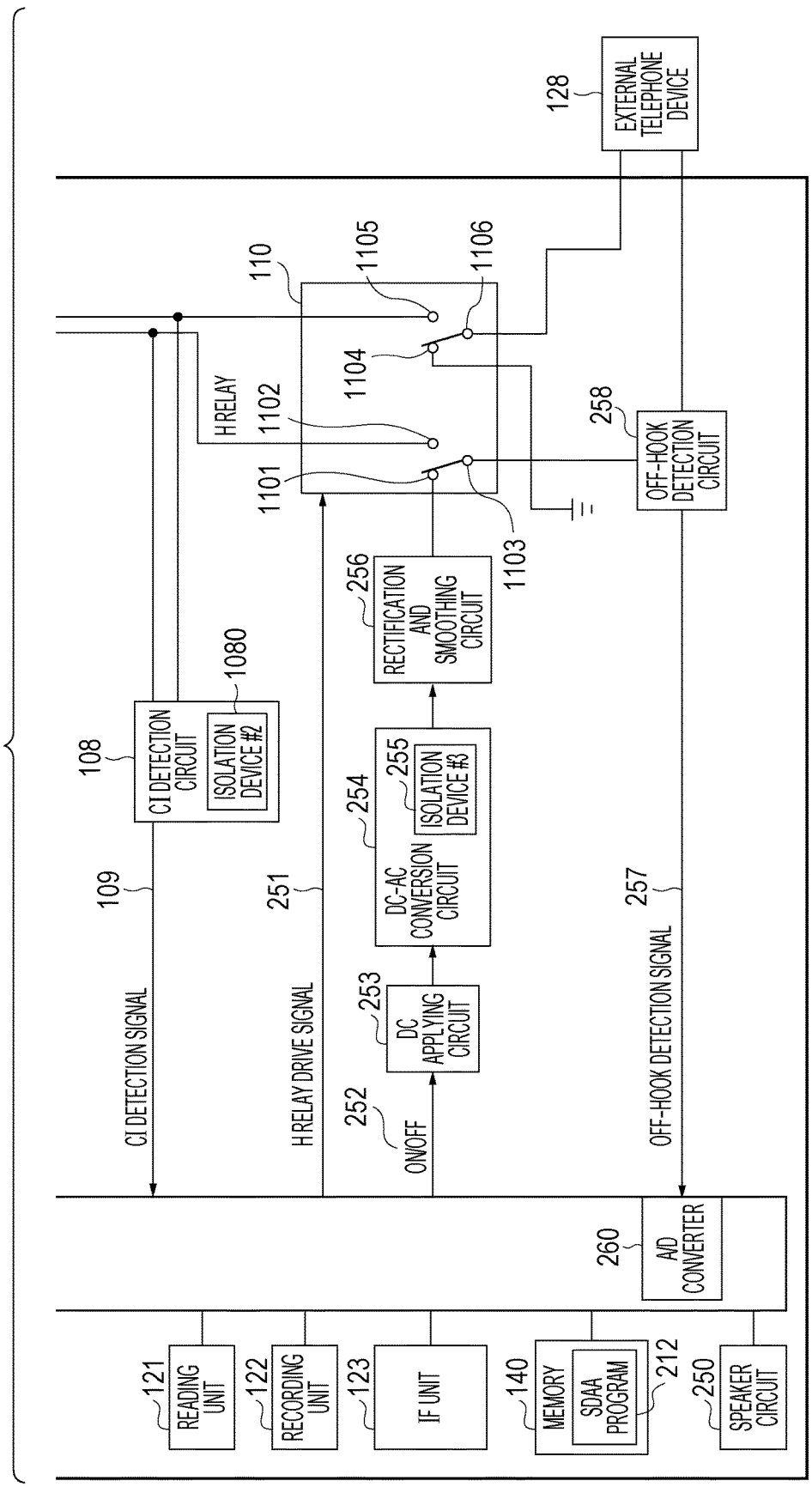

A facsimile apparatus according to a first embodiment of the disclosure is described below with reference to block diagrams illustrated in FIGS. 1A and 1B.

In the present embodiment, it is assumed by way of example that the facsimile apparatus 100 communicates with a destination facsimile apparatus 220 via a public switched telephone network (PSTN) 210.

Note that in addition to the facsimile apparatus 220, many other apparatuses such as another facsimile apparatus, a multi function peripheral (MFP), etc. may be connected to the PSTN 210, and thus facsimile apparatus 100 may communicate with those apparatuses.

The facsimile apparatus 100 includes a system-on-a-chip (SOC) 101.

The SOC 101 includes a central processing unit (CPU) 200 that generally controls the facsimile apparatus 100.

A memory 140, which is a nonvolatile main storage device, is connected to the SOC 101 such that the memory 140 functions as a work memory of the CPU 200. The memory 140 also functions as a memory used to temporarily store image data and various kinds of information necessary in communication when facsimile transmission or facsimile reception is performed. The memory 140 also stores setting information given in advance.

A silicon data access arrangement (SDAA) program 212 is transferred by the CPU 200 to a modem 102 and loaded in a random-access memory (RAM) 204. The SDAA program 212 is executed by a digital signal processor (DSP) 205.

Furthermore, the SOC 101 is connected to an operation panel 118, a reading unit 121, a recording unit 122, and an interface (IF) unit 123.

The operation panel 118 includes a display 119 and a key set 120 such as a keyboard so as to provide a user interface. The display 119 includes a liquid crystal display or the like and functions to display a status of the apparatus, a menu, etc. The key set 120 is a keyboard including a button, a ten-key pad, and the like for accepting inputting of various instructions given by a user. Using this keyboard, a user is allowed to input setting information.

The reading unit 121 reads an image of a document and generates image data. The generated image data may be facsimile-transmitted to a destination apparatus via a communication line (also referred to as a telephone line or a public line) 130, or may be printed by the recording unit 122. The reading unit 121 may read a document put on a document plate. The reading unit 121 may include an automatic document feeder (ADF) and may read a document fed by the ADF.

The recording unit 122 performs printing based on image data generated by the reading unit 121 or image data received via the communication line 130.

The IF unit 123 functions as an interface for connecting to an external apparatus. The facsimile apparatus 100 is connected to an external personal computer (PC) via the IF unit 123 and a network or a Universal Serial Bus (USB). The facsimile apparatus 100 receives a command from the external PC and performs various settings and control operations based on the received command.

A speaker circuit 250 receives a CI signal (calling signal) from the PSTN 210 and outputs a pseudo telephone ringing sound.

The modem 102 is connected to the SOC 101 and functions as a modulator/demodulator configured to operate based on a command given from the SOC 101. The modem 102 performs a modulation process on image data generated by the reading unit 121 by reading an image of a document, and performs a demodulation process on a signal received via the communication line 130. The modem 102 is also connected to a silicon data access arrangement (SDDA) (also referred to as a semiconductor NCU) 104 via an insulation device #1 (103).

In the modem 102, a read-only memory (ROM) 203 is a memory storing a program executed by a DSP 205. A RAM 204 functions as a work memory used by the DSP 205. In the RAM 204, the SDDA program 212 transferred from the memory 140 or the program read out from the ROM 203 is loaded. The DSP 205 executes the program loaded in the RAM 204 to perform various kinds of control.

A register 206 stores data indicating a state of the SDAA 104 or a command received from the SOC 101.

The SDAA 104 is an example of a network control unit.

The SDAA 104 is a network control apparatus functioning as an interface between the facsimile apparatus 100 and the external communication line 130. The SDAA 104 operates under the control of the SOC 101. For example, when communication with the facsimile apparatus 220 via the communication line 130 is performed, the SDAA 104 captures or releases a line.

An external telephone device 128 connected to the facsimile apparatus 100 is also connected to a destination apparatus via the communication line 130. The external telephone device 128 is connected to the communication line 130 via an H relay 110, while the SDAA 104 is connected, in parallel with the telephone device 128, to the communication line 130. In addition to the process of capturing a line and controlling a communication when a facsimile transmission/reception operation is performed, the SDAA 104 also controls connecting to (capturing) a line when the external telephone device 128 performs a voice communication with a destination apparatus via the communication line 130.

The SDAA 104 controls a DC capture state of the line using a line capture unit 105. When a line is DC-captured (direct current captured) by the line capture unit 105, the DC impedance is variable. This impedance is determined by performing control according to a preset DC voltage-current characteristic (hereinafter referred to as DC-VI characteristic).

A voltage detection unit 150 detects a voltage (line voltage) on a line.

A current detection unit 151 detects a current (line current) flowing through the line.

An AC filter unit 201 is disposed in front of the voltage detection unit 150 or the current detection unit 151 in order to prevent an error detection from occurring due to an AC component when the voltage detection unit 150 or the current detection unit 151 detects a DC voltage or a DC current.

A DC resistance adjustment unit 202 adjusts the DC resistance in the off-hook state according to a predetermined target DC-VI characteristic.

Transmission gain is an increase in strength of a signal during its transmission from one point to another, usually expressed as a ratio of the power at the second or reception point, to the power at the first or transmission point. Amplification is a process of producing an output. which is greater or smaller than the input. An amplifier (AMP) 901 amplifies a signal according to a transmission gain specified by the SOC 101 via the modem 102.

A DC capture circuit 152 is a circuit realized using transistors and the like and is configured to adjust the DC impedance while performing DC capturing under the control of the SDAA 104. The DC capture circuit 152 is also used to release a line, transmit a dial pulse which is one of selection signals to select a line, etc. A line 230 is a line into which a current flows from the PSTN 210. A line 240 is a line from which the current returns to the PSTN 210. The voltage detection unit 150 detects a line voltage by detecting a voltage between the line 230 and the line 240. The current detection unit 151 detects a line current by detecting a current flowing through the line 230 or the line 240.

A rectifier circuit 155 includes a diode bridge circuit and the like and is configured to rectify a signal given from a line and supply the resultant rectified signal to the SDAA 104.

A reception IF circuit 153 is an interface circuit configured to receive a signal such as a facsimile signal received via the line 130.

An alternating current (AC) impedance matching circuit 154 is a circuit for achieving impedance matching during a communication process. For example, in Japan, it is supposed to adjust the AC impedance to 600Ω (ohms).

A noise filter circuit 156 suppresses noise such as a lightning surge, electromagnetic noise, or the like from the communication line 130. The noise filter circuit 156 also serves to prevent internal noise of the facsimile apparatus 100 from being transmitted out via the communication line 130.

A CI detection circuit 108 is connected to the communication line 130 and detects a CI signal received from the communication 130. When the CI detection circuit 108 detects a CI signal from the communication line, the CI detection circuit 108 transmits a CI detection signal 109 to the SOC 101 to notify that the CI signal is received. Based on the CI detection signal 109, the SOC 101 is capable of determining whether the CI signal from the communication line 130 has been received.

An insulation device #2 (1080) is an insulation device disposed in the CI detection circuit 108. The insulation device #2 (1080) is for providing isolation. between the PSTN 210 applied with a high voltage and the SOC 101 driven with a low voltage.

An H relay 110 switches between a state in which the external telephone device 128 is connected to the communication line 130 and a state in which the external telephone device 128 is disconnected from the communication line 130.

The H relay 110 includes relay contacts 1101 to 1106.

According to an H relay driving signal 251 supplied from the SOC 101, the relay contact 1101 is in a state in which the relay contact 1101 is connected to the relay contact 1103 or a state in which the relay contact 1101 is disconnected from the relay contact 1103. According to the H relay driving signal 251 supplied from the SOC 101, the relay contact 1102 is in a state in which the relay contact 1102 is connected to the relay contact 1103 or a state in which the relay contact 1102 is disconnected from the relay contact 1103. The relay contact 1103 is a contact connected to the external telephone device 126.

The relay contact 1104 is in, according to an H relay driving signal 251 supplied from the SOC 101, a state in which the relay contact 1104 is connected to the relay contact 1106 or a state in which the relay contact 1104 is disconnected from the relay contact 1106. The relay contact 1105 is in, according to the H relay driving signal 251 supplied from the SOC 101, a state in which the relay contact 1104 is connected to the relay contact 1106 or a state in which the relay contact 1104 is disconnected from the relay contact 1106. The relay contact 1106 is connected to the external telephone device.

The H relay 110 is controlled by the H relay driving signal 251 supplied from the SOC 101. Note that in a state in which the telephone device is disconnected by the H relay 110 from the communication line 130 as in a case shown in FIGS. 1A and 1B, the telephone device does not ring when a CI signal is received from the communication line 130. When the facsimile apparatus 100 is in this state, it is said that the facsimile apparatus 100 is in a no-ring call reception mode.

On the other hand, in a state where the relay contact 1102 is connected to the relay contact 1103, and the relay contact 1105 is connected to the relay contact 1106, the external telephone device 128 is in a connected state in which the external telephone device 128 is connected to the communication line 130. In this case, when a CI signal from the communication line 130 is received, the telephone device rings. If a handset of the external telephone device 128 is hooked off, it becomes possible to start a telephone voice communication with a destination telephone device via the communication line 130.

The SOC 101 supplies an ON/OFF signal 252 to a DC applying circuit 253 to set the DC applying circuit 253 to an ON or OFF state in terms of DC application. A DC/AC conversion circuit 254 is a circuit configured to convert DC supplied from the DC applying circuit 253 to AC. An insulation device #3 (255) is for providing isolation. between the PSTN 210 applied with a high voltage and the SOC 101 driven with a low voltage.

A rectifying/smoothing circuit 256 is for converting an AC signal output from the DC/AC conversion circuit 254 to a DC signal. Off-hook is one of two possible signaling states and exists when a telephone or other user instrument such as a facsimile is in use, i.e., during dialing or communicating. It is the active state of the telephone, i.e., a closed loop of a subscriber line or private branch exchange (PBX) user loop. During off-hook, data transmission is enabled either for (a) voice or data communications or (b) network signaling. On-hook is the other of the two possible signaling states and exists when a telephone or other user instrument is not in use, i.e., when idle waiting for a call. It is the idle state of the telephone, i.e., an open loop of a subscriber line or PBX user loop. During on-hook, data transmission is disabled and a high impedance, or "open circuit", is presented to the link by the end instrument(s) to release a line or channel.

When an off-hook detection circuit 258 detects hooking off at the external telephone device 128, the off-hook detection circuit 258 sends an off-hook detection signal 257 to the DC 101 via an analog-to-digital converter 260. The voltage of the off-hook detection circuit 258 changes depending on whether the external telephone device 128 is in an on-hook state in which the impedance is high or an off-hook state in which the impedance is low.

A audio codec (audio coder/decoder) 300 codes an audio signal input via a MIC (microphone) 304 and sends the resultant coded audio signal to the modem 102 which in turns transmits the coded audio signal to the communication line 130. When the audio codec 300 receives an audio signal from a caller telephone device via the modem 102, the audio codec 300 decodes the audio signal to a signal to be output from a speaker 305.

A transmission gain/frequency characteristic control unit 301 controls the gain (amplification gain) and the frequency characteristic when an audio signal is transmitted to a line.

A reception gain/frequency characteristic control unit 302 controls the gain (amplification gain) and the frequency characteristic of an audio signal received from the communication line 130.

A handset 303 is for use by a user of the facsimile apparatus 100 in a telephone voice communication with the facsimile apparatus 220.

The MIC 304 is for converting a voice of a user to an electric signal.

The speaker 305 converts the electric signal to an audible voice/sound and outputs the resultant voice/sound.

An on/off-hook detection switch 306 is configured to detect whether the handset 303 is in a state (on-hook state) in which it is put on the facsimile apparatus or a state (off-hook state) in which the handset is off the facsimile apparatus and thus it is allowed to perform a telephone voice communication. The on/off-hook detection switch 306 may be realized using a mechanical switch or the like.

A MIC interface circuit 307 is an interface configured to control transmission of a signal between the MIC 304 and the audio codec 300.

A speaker interface circuit 308 is an interface configured to control transmission of a signal between the speaker 305 and the audio codec 300.

The facsimile apparatus 100 configured in the above-described manner according to the present embodiment is capable of performing facsimile transmission/reception to/from the facsimile apparatus 220 at the opposite end of the line via the communication line 130. Furthermore, the facsimile apparatus 100 according to the present embodiment includes the handset 303 that allows it to perform a telephone voice communication with the facsimile apparatus 220 at the opposite end of the line via the communication line 130. Note that in the present embodiment, the external telephone device 128 does not necessarily need to be connected to the facsimile apparatus 100. By configuring the facsimile apparatus 100 to include the communication function using the handset 303, the audio codec 300, and the like as described above, it becomes possible to realize the communication function at a lower cost than in a case where the external telephone device 128 is separately prepared.

Furthermore, in the facsimile apparatus 100, to ensure the facsimile communication performance, the SDAA 104 is provided to change, with time, the impedance of the facsimile apparatus according to the DC-VI characteristic set in the SDAA 104.

In the present embodiment, the facsimile apparatus 100 is configured to properly determine the impedance of the line even when a change occurs in the impedance of the facsimile apparatus. This makes it possible to properly determine the transmission gain depending on the impedance of the line, and thus it becomes possible to perform a telephone voice communication with a proper voice volume.

A principle of properly determining the line impedance according to the present embodiment is described below with reference to FIG. 2, FIG. 3, and FIG. 4.

FIG. 2 is a diagram illustrating a voltage appearing when the facsimile apparatus 100 is in the on-hook state.

Impedance is a measure of the opposition that a circuit presents to flow of a current in a line. A line impedance R1 (3401) is a line impedance between the facsimile apparatus 100 and a telephone station (exchanging system) 3402. Note that the line impedance is actually distributed along both sides of the line. FIG. 4 illustrates an example of line impedance per a distance of 1 km (kilometer). In FIG. 3, for convenience of illustration, an overall equivalent impedance is denoted as R1.

Figure 3:
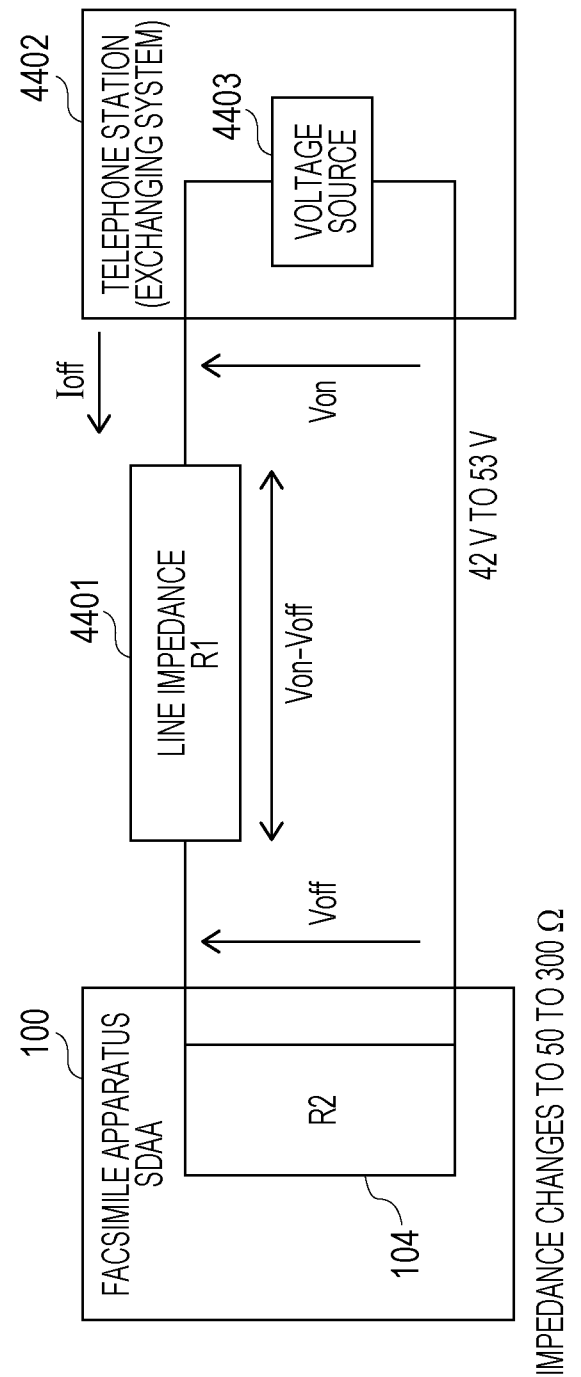
FIG. 3 is a block diagram illustrating a configuration of a system including a facsimile apparatus and an exchanging station according to an embodiment.

More specifically, for example, in the standard GB/T15279-2002 established by China NAL to specify technical requirements, test methods, reliability test, marking, and packing for fixed automatic telephone sets, R (resistor) and C (capacitor) in FIG. 3 are specified as R=47±0.5Ω and C=47±0.5 nF (nanofarads). When the impedance is seen from a DC power source, the capacitive component C can be neglected. In the example shown in FIG. 4, the resultant resistance is given by 47×4=188Ω. For example, when the distance is 5 km, then R=940Ω. When the distance is 2.5 km, R=470Ω.

A voltage source 3403 is a voltage source disposed in the telephone station (exchanging system) 3402. The voltage source 3403 is for applying a DC voltage to the facsimile apparatus 100.

When the facsimile apparatus 100 is in the on-hook state, the impedance R2 of the SDAA 104 is nearly infinite. Therefore, no current flows through the line with the line impedance R1 (3401), and thus a voltage Von measured at the SDAA 104 is nearly equal to the voltage of the voltage source at the telephone station.

FIG. 3 is a diagram illustrating a voltage appearing when the facsimile apparatus 100 is in the off-hook state.

In FIGS. 3, 4401, 4402, and 4403 respectively denote the same units denoted by 3401, 3402, and 3403 in FIG. 2.

When the facsimile apparatus 100 is in the off-hook state, a voltage Voff appears at the SDAA 104, and a current Ioff flowing through the line impedance R1 is the same as a current flowing through the SDAA 104. In this state, a voltage Von−Voff is applied across the line impedance R1.

In the off-hook state, the impedance R2 of the SDAA 104 is varied within a range from about 50 to 300Ω according to the target DC-VI characteristic preset in the SDAA 104 to ensure the facsimile communication performance.

Figure 4:
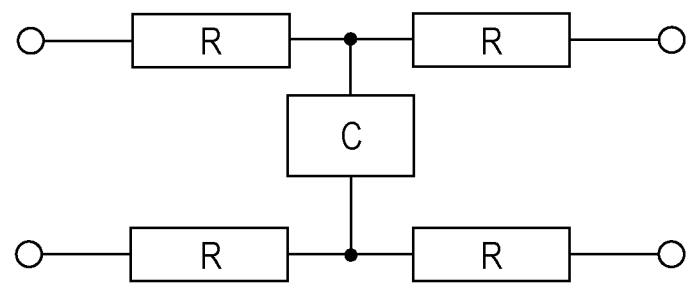
FIG. 4 is a diagram illustrating a line impedance.

FIG. 4 is a diagram illustrating an example of a target DC-VI characteristic preset in the SDAA 104. A horizontal axis represents a current I, and a vertical axis represents a voltage V. The SDAA 104 adjusts the impedance so as to accord to the target DC-VI characteristic.

The SDAA 104 includes therein a DC resistance adjustment unit 202. The DC resistance adjustment unit 202 operates as follows. When the DC voltage of the SDAA 104 itself is low, a limit is imposed and thus degradation in signal quality occurs. When a line current is large, if a voltage is large, then the result is an increase in power, which may result in an increase in heat and thus a reduction in life. To avoid the above situation, the impedance is determined such that when the current is small as in a region A in FIG. 5, the voltage is increased, while when the current is large as in a region B in FIG. 5, the voltage is reduced.

Figure 5:
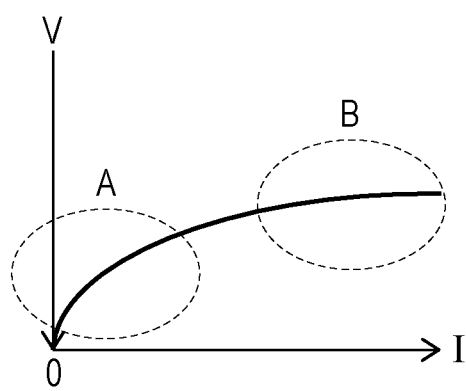
FIG. 5 is a diagram illustrating an example of a target DC-VI characteristic preset in a modem and an SDAA.
Figure 6:
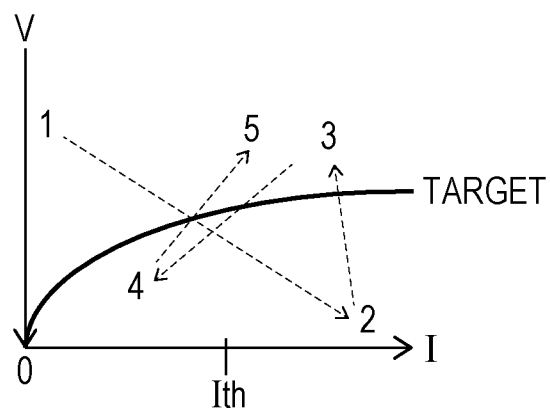
FIG. 6 is a diagram illustrating a change in current and a change in voltage that may occur after a handset is hooked off.

FIG. 6 illustrates a manner in which a current and a voltage change after the handset is lifted off the hook according to the DC-VI characteristic shown in FIG. 5. A horizontal axis represents a current I, and a vertical axis represents a voltage V. The SDAA 104 changes the impedance so as to accord to the target DC-VI characteristic, from time to time, for example, in order 1→2→3→4→5.

Figure 7:
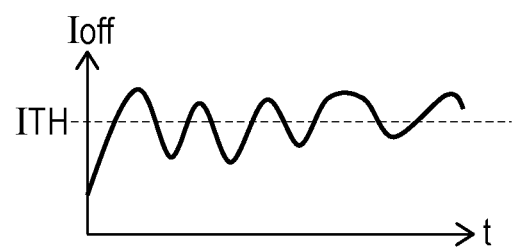
FIG. 7 is a diagram illustrating an example of a change with time in a line current that may occur immediately after a handset is hooked off.

FIG. 7 is a diagram illustrating an example of a change with time in a current that may occur after a handset is lifted off the hook. A horizontal axis represents time, and a vertical axis represents a current I. If a threshold value Ith in terms of the off-hook current is defined as shown in FIG. 7, and if it is tried to switch the gain according to the threshold value Ith, a frequent change in current with time may cause the gain to change frequently. Therefore, it is difficult to properly determine the transmission gain only according to the line current in the off-hook state.

Note that the value of R1 is determined depending on the length (distance) of the line from the facsimile apparatus 4100 to the telephone station (exchanging system), and the value of R1 does not change when the impedance R2 of the SDAA 3104 changes. In the present embodiment, taking the above fact into consideration, the facsimile apparatus 100 is configured such that the SDAA 4104 detects the current Ioff and the voltage Voff and calculates the line impedance R1 according to a formula (Von−Voff)/Ioff.

Figure 8:
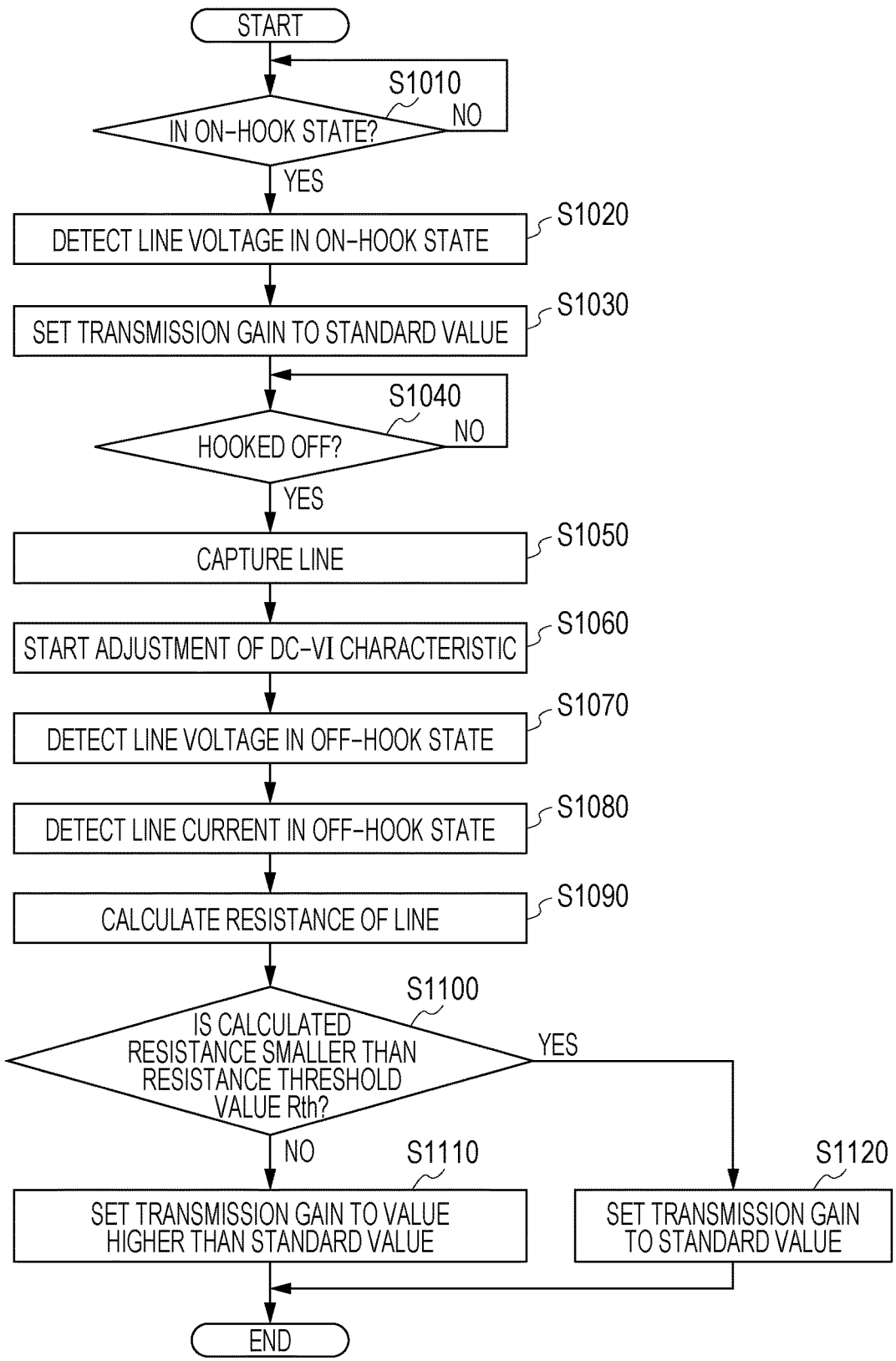
FIG. 8 is a flow chart illustrating an example of a control process according to a first embodiment.

Next, an example of controlling the facsimile apparatus 100 according to the present embodiment is described below with reference to a flow chart shown in FIG. 8. The process shown in the flow chart of FIG. 8 is performed by the CPU 200 by executing a program stored in the memory 140.

In S1010, the CPU 200 performs a determination based on a signal from the on/off-hook detection switch 306 as to whether the facsimile apparatus 100 is in the on-hook state or not. When the on/off-hook detection switch 306 detects that the handset 303 is in a state in which the handset 303 is set in a predetermined position, a signal indicating that the handset 303 is in the on-hook state is supplied to the CPU 200. On the other hand, when the on/off-hook detection switch 306 detects that the handset 303 is in a state in which the handset 303 is off the predetermined position, a signal indicating that the handset 303 is in the off-hook state is supplied to the CPU 200. Based on this signal, the CPU 200 determines whether the handset 303 is in the on-hook state or not. In a case where it is determined that the handset 303 is not in the on-hook state, the CPU 200 waits until the handset 303 goes to the on-hook state. In a case where it is determined that the handset 303 is in the on-hook state, the CPU 200 advances the process to S1020.

In S1020, the CPU 200 instructs the SDAA 104 to detect the line voltage using the voltage detection unit 150. A value of the line voltage detected by the voltage detection unit 150 is notified to the SOC 101 via the modem 102. The CPU 200 stores the notified value of the line voltage in the memory 140. In the on-hook state, the line capture unit 105 of the SDAA 104 does not capture a line. Therefore, the impedance of the facsimile apparatus 100 is nearly infinite. In S1020, the line voltage in this situation is detected. This line voltage is nearly equal to a voltage value of the voltage source 3403 of the telephone station (exchanging system) 3402.

In S1030, the transmission gain/frequency control unit 301 sets the transmission gain to a normal value. The set value of the transmission gain is stored in the memory 140 by the CPU 200. The value of the transmission gain set herein may be predetermined, for example, based on the SLR (Send Loudness Rating). In the present embodiment, the normal value of the transmission gain set in S1030 is, by way of example, 10 dB (decibel).

In S1040, the CPU 200 determines whether the handset 303 is lifted off the hook. This may be detected by the on/off-hook detection switch 306, for example, by detecting lifting-up of the handset by a user to start a telephone voice communication. In a case where it is determined that the handset 303 is not in the off-hook state, the CPU 200 repeats the process in S1040. However, in a case where it is determined that the handset 303 has been lifted off the hook, the processing flow proceeds to S1050.

In S1050, the CPU 200 sends a command via the modem 102 to the SDAA 104 to capture a line. The SDAA 104 DC-captures a line using the line capture unit 105.

In S1060, to ensure the facsimile communication performance, the SDAA 104 changes the DC resistance using the DC resistance adjustment unit 202 within a range from about 50 to 300Ω according to the target DC-VI characteristic preset in the SDAA 104.

In S1070, the CPU 200 instructs the SDAA 104 to detect the line voltage using the voltage detection unit 150. The value of the line voltage detected by the voltage detection unit 150 is notified via the modem 102 to the SOC 101. The CPU 200 stores the notified value of the line voltage in the memory 140. In the off-hook state, the line capture unit 105 in the SDAA 104 captures a line, and the voltage on this captured line is detected in S1070.

In S1080, the CPU 200 instructs the SDAA 104 to detect a line current using the current detection unit 151. The value of the line current detected by the current detection unit 151 is notified to the SOC 101 via the modem 102. The CPU 200 stores the notified value of the line current in the memory 140. In the off-hook state, the line capture unit 105 of the SDAA 104 captures a line, and the current flowing through this captured line is detected in S1080.

In S1090, according to the values thereof stored in the memory 140, the CPU 200 subtracts the line voltage in the off-hook state from the line voltage in the on-hook state, and divides the result by the line current in the off-hook state thereby determining the resistance value of the line (line impedance R1). The method of determining the resistance value of the line is not limited to the calculation. For example, a table representing a relationship among the line voltage in the on-hook state, the line voltage in the off-hook state, the line current in the off-hook state, and the resistance value of the line may be stored in advance in the memory 140, and the CPU 200 may retrieve a resistance value of a line by looking up the table.

In S1100, the CPU 200 determines whether the resistance value calculated in S1090 is equal to or smaller than a threshold value of resistance (hereinafter, referred to as Rth). Rth may be, for example, 470Ω (which corresponds to the impedance of a line with a length of 2.5 km). In the standard GB/T15279-2002 established by China NAL, SLR is specified as 5 dB or larger for 0 km and 15 dB or smaller for 5 km. In the present embodiment, an impedance for an intermediate length of 2.5 km (470Ω) is employed as the threshold value. In a case where it is determined in S1100 that the resistance value calculated in S1090 is equal to or smaller than the threshold value Rth of the resistance value, the CPU 200 advances the process to S1120. In this case, it is possible to estimate from the calculated resistance value that the distance from the facsimile apparatus 100 to the telephone station (exchanging system) is equal to or smaller than 2.5 km.

In a case where the process proceeds to S1120, the CPU 200 notifies the transmission gain/frequency characteristic control unit 301 that the resistance value calculated in S1090 is equal to or smaller than the threshold value Rth of the resistance value. In response to receiving the notification, the transmission gain/frequency characteristic control unit 301 sets the transmission gain to be equal to 10 dB set in S1030 as the normal transmission gain.

On the other hand, in a case where it is not determined in S1100 that the resistance value calculated in S1090 is equal to or smaller than the threshold value Rth of the resistance value, the processing flow proceeds to S1110. In this case, it is possible to estimate from the calculated resistance value that the distance from the facsimile apparatus 100 to the telephone station (exchanging system) is larger than 2.5 km.

In this case, in S1110, the CPU 200 notifies the transmission gain/frequency characteristic control unit 301 that the resistance value calculated in S1090 is larger than the threshold value Rth of the resistance value. In response to receiving the notification, the transmission gain/frequency characteristic control unit 301 sets the transmission gain to be higher than the normal value. For example, the transmission gain/frequency characteristic control unit 301 adds 6 dB to the normal transmission gain of 10 dB set in S1030, and employs the resultant value 16 dB as the transmission gain. The CPU 200 stores the set transmission gain in the memory 140.

That is, in the case where the line impedance is larger than a value corresponding to the distance of 2.5 km to the exchanging system of the telephone station, the transmission gain is set to be higher than the normal transmission gain. On the other hand, in the case where the line impedance is equal to or smaller than the value corresponding to the distance of 2.5 km to the exchanging system of the telephone station, the transmission gain is set to be equal to the normal transmission gain. The CPU 200 stores the set transmission gain in the memory 140.

After the transmission gain is set in the above-described manner, the CPU 200 notifies the modem 102 of the transmission gain stored in the memory 140. In the modem 102, the AMP 901 of the SDAA 104 amplifies a signal according to the set transmission gain. For example, a signal input from the MIC 304 of the handset 303 is amplified by the transmission gain and transmitted to the facsimile apparatus 220. In the present embodiment, the discussion is focused on the transmission gain. Note that the gain in amplifying a signal received from the facsimile apparatus 220 may be determined in a similar manner such that the signal received from the facsimile apparatus 220 is properly amplified and transmitted to the speaker 305.

In an apparatus including a unit such as the SDAA 104 configured to make adjustment according to a predetermined target DC-VI characteristic to ensure the facsimile communication performance, it is possible to properly determine the line impedance by performing the process as described above. Furthermore, the determining of the line impedance makes it possible to properly adjust the transmission gain. Furthermore, it becomes possible to calculate the line impedance regardless of the voltage on the side of the telephone station.

Second Embodiment

In a second embodiment described above, the process of determining the line impedance described above in the first embodiment is determined only when a line is disconnected and a new line is connected. In a case in which the line voltage is detected always during the on-hook state, a large processing load is imposed on the SOC 101. For example, because the SOC 101 needs to perform the associated process during the on-hook state, the facsimile apparatus 100 is not allowed to go to a power saving mode. However, the line voltage in the on-hook state is basically constant as long as the same line is connected to the facsimile apparatus 100.

In the present embodiment, in view of the above, the line voltage is detected only when a new line is connected.

Figure 9:
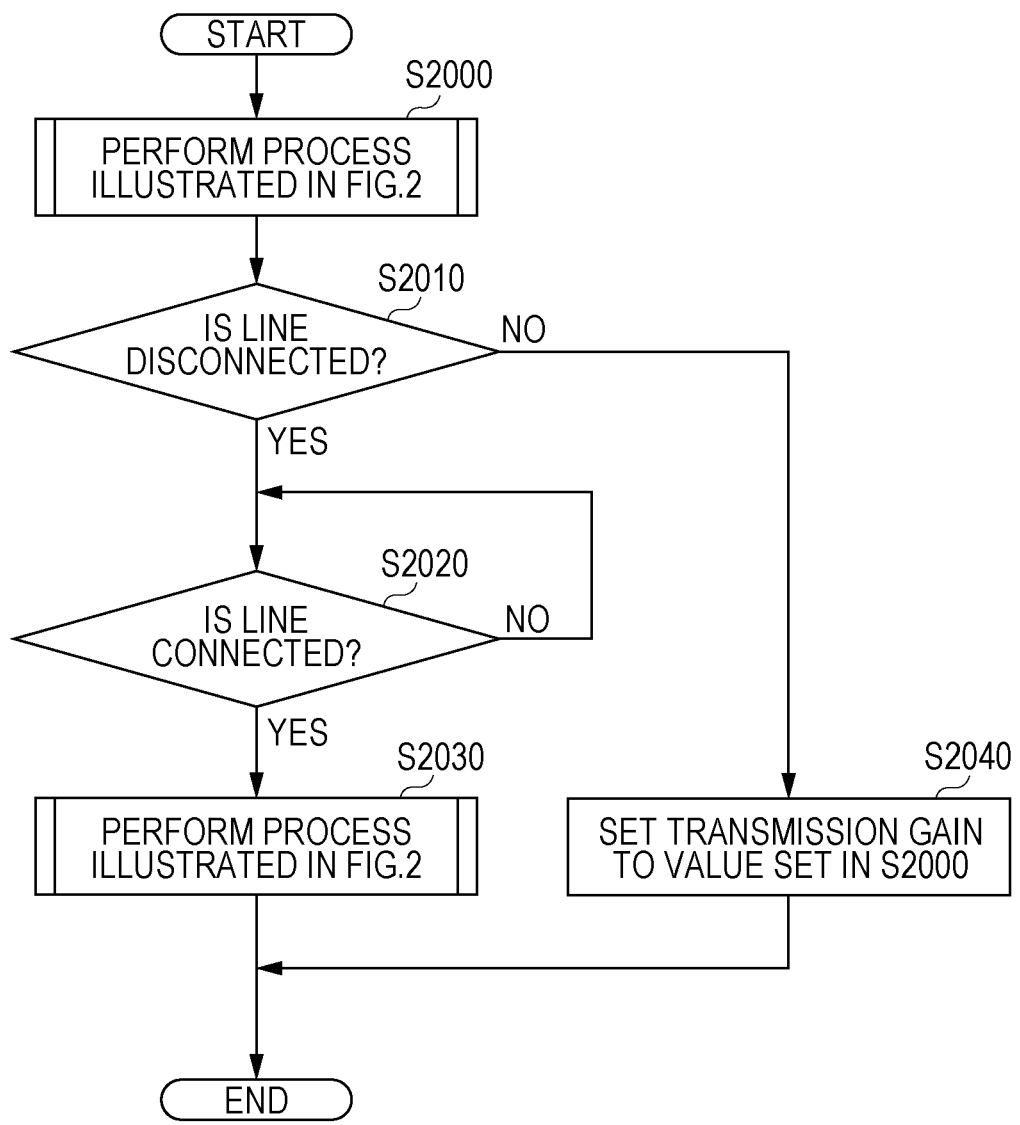
FIG. 9 is a flow chart illustrating an example of a control process according to a second embodiment.

FIG. 9 is a flow chart illustrating an example of controlling the facsimile apparatus 100.

In S2000, the facsimile apparatus 100 sets the transmission gain in the manner described above with reference to FIG. 2, and performs a telephone voice communication. When the facsimile apparatus 100 goes to the on-hook state after the end of the telephone voice communication, the processing flow proceeds to S2010. Note the processing flow may proceed to S2010 before the facsimile apparatus 100 goes to the on-hook state after the end of the telephone voice communication.

In S2010, the CPU 200 determines whether the line 130 is disconnected from the facsimile apparatus 100. In a case where it is determined that the line 130 is disconnected, the processing flow proceeds to S2020. However, in a case where it is determined that the line 130 is not disconnected, the processing flow proceeds to S2040.

In S2020, the CPU 200 determines whether a line is connected to the facsimile apparatus 100. The CPU 200 repeats the process in S2020 until it is determined that a line is connected. If it is determined that a line is connected, the processing flow proceeds to S2030.

In S2030, the CPU 200 performs the process shown in FIG. 2 to again set the transmission gain and perform a telephone voice communication.

In a case where the processing flow proceeds to S2040 from S2010, the CPU 200 sets the transmission gain to be equal to the value stored in the memory 140 in S2000.

After the transmission gain is set in the above-described manner, the CPU 200 notifies the modem 102 of the transmission gain stored in the memory 140. In the modem. 102, the AMP 901 of the SDAA 104 amplifies a signal according to the set transmission gain. For example, a signal input from the MIC 304 of the handset 303 is amplified by the transmission gain and transmitted to the facsimile apparatus 220. In the present embodiment, the discussion is focused on the transmission gain. However, the gain in amplifying a signal received from the facsimile apparatus 220 may be determined in a similar manner such that the signal received from the facsimile apparatus 220 is properly amplified and transmitted to the speaker 305.

In the present embodiment, as described above, setting of the line impedance is performed again only when the line is disconnected and a new line is connected. Note that when a line is connected for the first time, it is possible to regard that a new line is connected and perform the process in S2030.

By performing the control in the above-described manner, it is possible to reduce the processing load imposed on the SOC 101, and it is possible to redetermine the line impedance when necessary.

Third Embodiment

In a third embodiment described below, a line impedance is determined only when the facsimile apparatus 100 is in a voice mode.

The voice mode is a mode in which a signal from a MIC 304 of the handset 303 is transmitted to a communication line by the modem 102, and a signal received from the communication line 130 is output to the speaker 305 of the handset 303. That is, in the voice mode, inputting/outputting of a signal between the handset 303 and the modem 102 is performed. In addition to the voice mode, the facsimile apparatus 100 has a facsimile mode in which a facsimile communication is performed via the modem 102.

In a case where the line impedance is calculated and the transmission gain is set again, considerable processing loads are imposed on the SOC 101, the modem 102, and the SDAA 104. This may cause a delay to occur in other processes performed by the SCO 101.

In the present embodiment, the above-described situation is handled by performing the process of determining the line impedance only when the facsimile apparatus 100 is in the voice mode thereby reducing the processing loads imposed on the SOC 101, the modem 102, and the SDAA 104.

Figure 10:
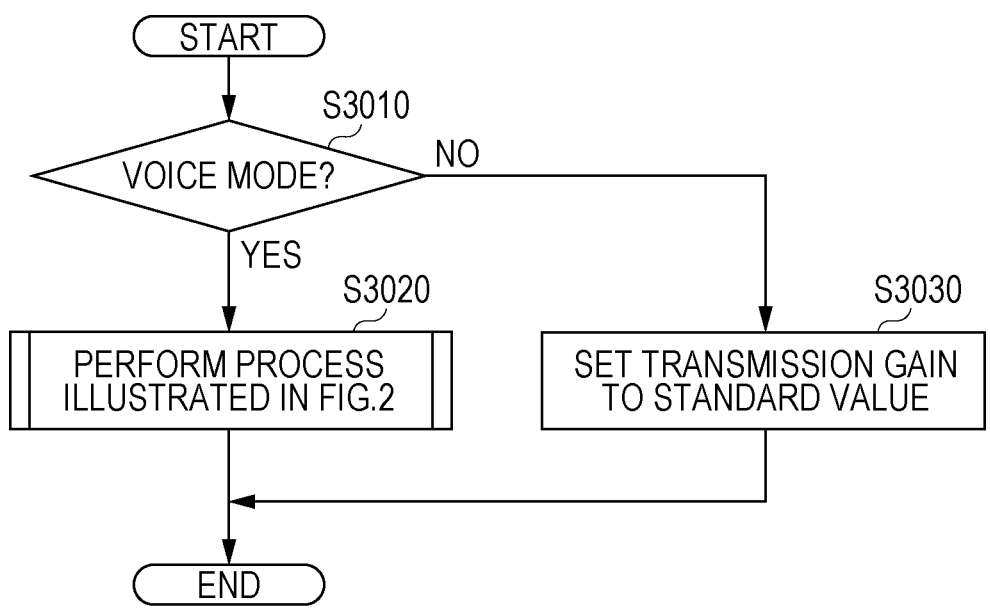
FIG. 10 is a flow chart illustrating an example of a control process according to a third embodiment.

FIG. 10 is a flow chart illustrating an example of controlling the facsimile apparatus 100.

In S3010, the CPU 200 determines whether the facsimile apparatus 100 is in the voice mode. Whether the facsimile apparatus 100 is operating in the voice mode or the facsimile mode is managed by a mode flag in the memory 140. The CPU 200 performs the determination based on this mode flag as to whether facsimile apparatus 100 is in the voice mode. In a case where it is determined that the facsimile apparatus 100 is in the voice mode, the processing flow proceeds to S3020. However, in a case where it is determined that the facsimile apparatus 100 is not in the voice mode, the processing flow proceeds to S3030.

In S3020, the process shown in FIG. 2 is performed.

In S3030, the CPU 200 sets the transmission gain to be equal to the normal transmission gain of 10 dB.

As described above, in the facsimile apparatus 100 according to the present embodiment, the process of determining the line impedance shown in FIG. 2 is performed to adjust the transmission gain only when the facsimile apparatus 100 is in the voice mode.

Thus, it is not necessary to perform the process to increase the transmission gain when the facsimile apparatus 100 is in the facsimile mode.

Other Embodiments

Each embodiment described above may also be realized by providing a program for realizing one or more functions of the embodiment to a system or an apparatus via a network or a storage medium, and reading out and executing the program by one or more processors in a computer disposed in the system or the apparatus. Each embodiment described above may also be realized using a circuit (for example, an application-specific integrated circuit (ASIC)) for realizing one or more functions of the embodiment.

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions, may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-116055, filed Jun. 8, 2015, which is hereby incorporated by reference herein in its entirety.

What is claimed is:

1. A facsimile apparatus comprising:
a first detection unit configured to detect a line voltage of a line in an on-hook state;
a second detection unit configured to detect a line voltage of the line in an off-hook state;
a third detection unit configured to detect a line current of the line in an off-hook state; and
a determination unit configured to determine whether the facsimile apparatus is in a voice mode,
wherein, in a case where it is determined that the facsimile apparatus is in a voice mode, the determination unit is configured to determine a line impedance based on the line voltage detected by the first detection unit, the line voltage detected by the second detection unit, and the line current detected by the third detection unit, and
wherein, in a case where it is determined that the facsimile apparatus is not in the voice mode, the determination unit is configured to not determine the line impedance.

2. The facsimile apparatus according to claim 1, further comprising a judgement unit configured to judge whether a line is connected,
wherein, in a case where the judgement unit judges that a line is connected, the determination unit determines the line impedance based on the line voltage detected by the first detection unit, the line voltage detected by the second detection unit, and the line current detected by the third detection unit.

3. The facsimile apparatus according to claim 1, wherein the voice mode is a mode in which inputting/outputting of a signal between a handset and a line is performed.

4. The facsimile apparatus according to claim 1, wherein the determination unit determines the line impedance such that the line impedance is given by a value obtained when a difference between the line voltage detected by the first detection unit and the line voltage detected by the second detection unit is divided by the line current detected by the third detection unit.

5. The facsimile apparatus according to claim 1, further comprising a setting unit configured to set a transmission gain based on the line impedance determined by the determination unit.

6. The facsimile apparatus according to claim 1, wherein the setting unit sets the transmission gain such that, in a case where the line impedance determined by the determination unit is larger than a threshold value, the set transmission gain is larger than in a case where the line impedance determined by the determination unit is equal to or smaller than the threshold value.

7. The facsimile apparatus according to claim 1, further comprising an adjusting unit that adjusts the signal input into the facsimile apparatus according to the set transmission gain.

8. The facsimile apparatus according to claim 1, wherein the on-hook state is based on a handset remaining on the hook and the off-hook state is based on the handset being lifted off the hook.

9. The facsimile apparatus according to claim 1, wherein, in a case where the line voltage of the line in the off-hook state, the facsimile apparatus captures the line and the second detection unit detects the line voltage on this captured line.

10. The facsimile apparatus according to claim 1, further comprising a setting unit configured to set a value of transmission gain base on a distance from the facsimile apparatus to an exchanging system estimated by the determination unit from the determined line impedance, whereby a signal input into the facsimile apparatus is configured to be adjusted according to the set transmission gain and transmitted at an adjusted audio signal level to the exchanging system.

11. A method of controlling a facsimile apparatus having a first detection unit, a second detection unit, a third detection unit, and a determination unit, the method comprising:
   detecting, via the first detection unit, a line voltage of a line in an on-hook state;
   detecting, via the second detection unit, a line voltage of the line in an off-hook state;
   detecting, via the third detection unit, a line current of the line in an off-hook state; and
   determining, using the determination unit, whether the facsimile apparatus is in a voice mode,
   wherein, in a case where it is determined that the facsimile apparatus is in a voice mode, determining includes determining a line impedance based on the line voltage detected by the first detection unit, the line voltage detected by the second detection unit, and the line current detected by the third detection unit, and
   wherein, in a case where it is determined that the facsimile apparatus is not in the voice mode, determining includes not determining the line impedance.

12. A non-transitory computer-readable storage medium storing a program to cause a computer to execute a method of controlling a facsimile apparatus having a first detection unit, a second detection unit, a third detection unit, and a determination unit, the method comprising:
   detecting, via the first detection unit, a line voltage of a line in an on-hook state;
   detecting, via the second detection unit, a line voltage of the line in an off-hook state;
   detecting, via the third detection unit, a line current of the line in an off-hook state; and
   determining, using the determination unit, whether the facsimile apparatus is in a voice mode,
   wherein, in a case where it is determined that the facsimile apparatus is in a voice mode, determining includes determining a line impedance based on the line voltage detected by the first detection unit, the line voltage detected by the second detection unit, and the line current detected by the third detection unit, and
   wherein, in a case where it is determined that the facsimile apparatus is not in the voice mode, determining includes not determining the line impedance.

13. A facsimile apparatus comprising:
   a first detection unit configured to detect a line voltage of a line in an on-hook state;
   a second detection unit configured to detect a line voltage of the line in an off-hook state;
   a third detection unit configured to detect a line current of the line in an off-hook state; and
   a determination unit configured to determine a line impedance based on the line voltage detected by the first detection unit, the line voltage detected by the second detection unit, and the line current detected by the third detection unit,
   wherein, in a case where it is determined that the facsimile apparatus is in a voice mode, the determination unit determines the line impedance such that the line impedance is given by a value obtained when a difference between the line voltage detected by the first detection unit and the line voltage detected by the second detection unit is divided by the line current detected by the third detection unit.

14. The facsimile apparatus according to claim 13, further comprising a judgement unit configured to judge whether a line is connected,
   wherein, in a case where the judgement unit judges that a line is connected, the determination unit determines the line impedance.

15. The facsimile apparatus according to claim 13, further comprising a setting unit configured to set a transmission gain based on the line impedance determined by the determination unit.

16. The facsimile apparatus according to claim 15, wherein the setting unit sets the transmission gain such that, in a case where the line impedance determined by the determination unit is larger than a threshold value, the set transmission gain is larger than in a case where the line impedance determined by the determination unit is equal to or smaller than the threshold value.

17. The facsimile apparatus according to claim 15, further comprising an adjusting unit that adjusts the signal input into the facsimile apparatus according to the set transmission gain.

18. The facsimile apparatus according to claim 13, further comprising a setting unit configured to set a value of transmission gain base on a distance from the facsimile apparatus to an exchanging system estimated by the determination unit from the determined line impedance, whereby a signal input into the facsimile apparatus is configured to be adjusted according to the set transmission gain and transmitted at an adjusted audio signal level to the exchanging system.

19. A method of controlling a facsimile apparatus having a first detection unit, a second detection unit, a third detection unit, and a determination unit, the method comprising:
   detecting, via the first detection unit, a line voltage of a line in an on-hook state;
   detecting, via the second detection unit, a line voltage of the line in an off-hook state;
   detecting, via the third detection unit, a line current of the line in an off-hook state; and
   determining, via the determination unit, a line impedance based on the line voltage detected by the first detection unit, the line voltage detected by the second detection unit, and the line current detected by the third detection unit,
   wherein, in a case where it is determined that the facsimile apparatus is in a voice mode, determining includes determining the line impedance such that the line impedance is given by a value obtained when a difference between the line voltage detected by the first detection unit and the line voltage detected by the second detection unit is divided by the line current detected by the third detection unit.

20. A non-transitory computer-readable storage medium storing a program to cause a computer to execute a method of controlling a facsimile apparatus having a first detection unit, a second detection unit, a third detection unit, and a determination unit, the method comprising:
   detecting, via the first detection unit, a line voltage of a line in an on-hook state;

detecting, via the second detection unit, a line voltage of the line in an off-hook state;
detecting, via the third detection unit, a line current of the line in an off-hook state; and
determining, via the determination unit, a line impedance based on the line voltage detected by the first detection unit, the line voltage detected by the second detection unit, and the line current detected by the third detection unit,
wherein, in a case where it is determined that the facsimile apparatus is in a voice mode, determining includes determining the line impedance such that the line impedance is given by a value obtained when a difference between the line voltage detected by the first detection unit and the line voltage detected by the second detection unit is divided by the line current detected by the third detection unit.

* * * * *